R. S. WILE.
METHOD OF REDUCING ORES.
APPLICATION FILED DEC. 2, 1913.
1,111,049.
Patented Sept. 22, 1914.
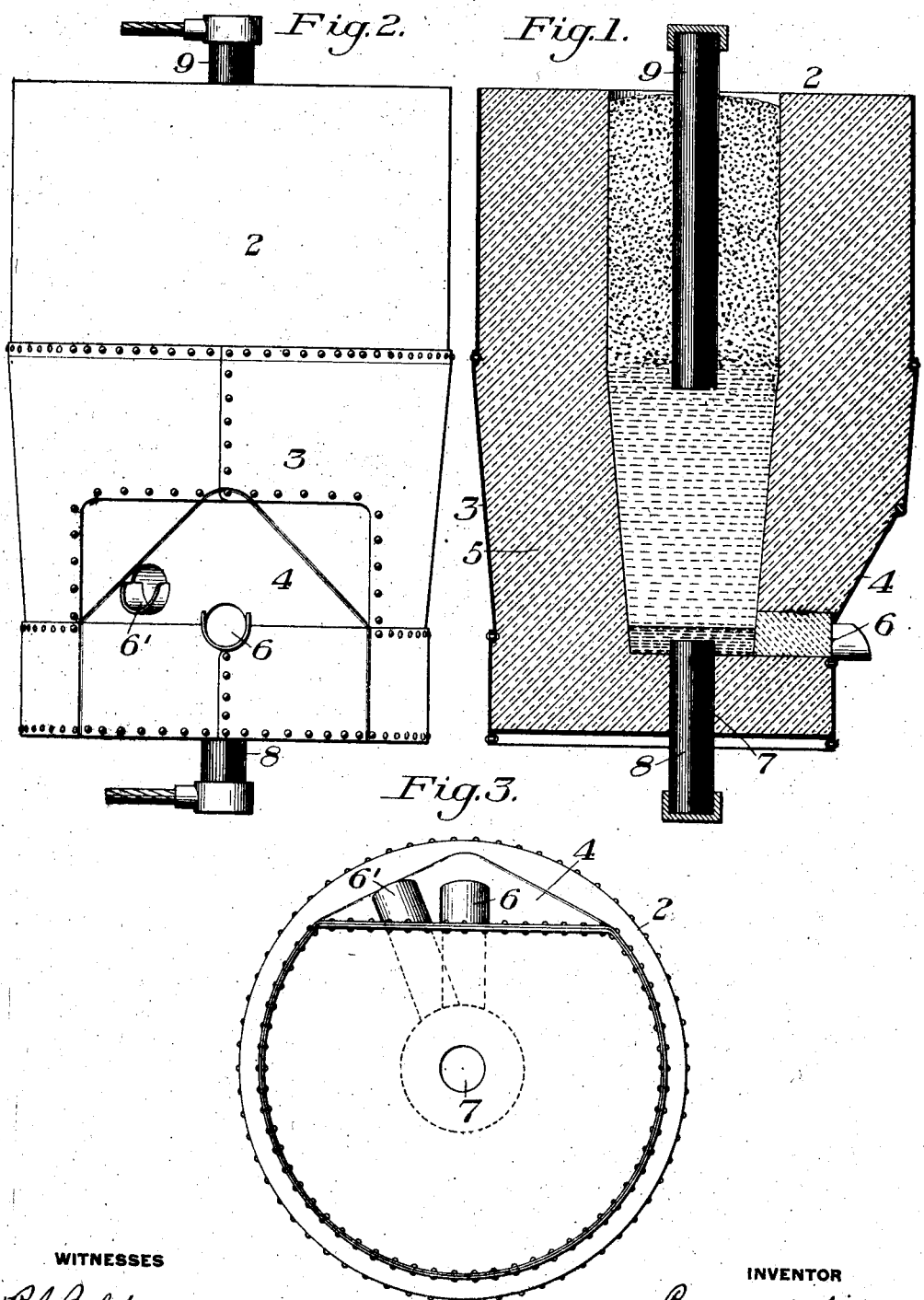

UNITED STATES PATENT OFFICE.

RAYMOND S. WILE, OF PITTSBURGH, PENNSYLVANIA.

METHOD OF REDUCING ORES.

1,111,049.  Specification of Letters Patent.  Patented Sept. 22, 1914.

Application filed December 2, 1913. Serial No. 804,202.

*To all whom it may concern:*

Be it known that I, RAYMOND S. WILE, a citizen of the United States, residing at Pittsburgh, in the county of Allegheny and State of Pennsylvania, have invented a new and useful Improvement in Methods of Reducing Ores, of which the following is a full, clear, and exact description, reference being had to the accompanying drawings, forming part of this specification, in which—

Figure 1 is a vertical central section of an electric furnace designed for carrying out my invention; Fig. 2 is a front elevation of the same; and Fig. 3 is a bottom plan view.

My invention relates to the reducing of ores and is designed to provide a cheap and efficient electric method by which ores may be reduced to mattes, metals or other elements or compounds carried thereby.

To that end, the invention consists in maintaining a bath of slag by means of an electric current which passes through the same in a vertical direction, thereby keeping it under control as to temperature and feeding into the upper part of said bath the ore to be reduced, thereby partially or wholly reducing the ore and tapping it out at the bottom from time to time, as desired. In this connection, I also preferably maintain the slag bath at such a density that the ore is held above the bath for a sufficient period to volatilize at least a part of its volatilizable deleterious compounds, such, for example, as arsenic or sulfur or their compounds, prior to the ore entering the bath and becoming melted. I also preferably employ a relatively deep bath of slag and a relatively high voltage of current, preferably over two hundred volts, in order to properly carry out my process in a continuous manner, since thereby a variation of ten to twenty-five volts in the current does not materially interfere with or prevent the proper carrying out of the process.

I will now describe my process as applied to copper-bearing ores which may also contain precious metals and usually sulfur or its compounds. In such case, I have used a relatively small furnace of fifteen to fifty tons capacity, such, for example, as shown in the drawings. In this case, the electric furnace is a vessel 2 of generally cylindrical form, preferably having its lower portion 3 tapered downwardly and inwardly slightly and cut inwardly on one side at 4 to reduce the length of the tap holes. This vessel may be formed of sheet steel and is lined with refractory material 5, preferably bricks of high refractory nature, such as chrome or magnesite. The vessel is formed with a lower metal tap hole 6 and a slag tap hole 6' at a higher level, the bottom of the vessel having a hole or holes 7 to receive the lower electrode or electrodes 8. An electrode 9 depends into the open top of the furnace.

In starting the operation, I drop into the furnace cold slag-forming materials which may be similar to the ore charge, preferably containing sufficient slag-forming materials to make a slag having about fifty per cent. silica. The upper electrode having been lowered into contact with the lower electrode, the cold charge is put in, the current is turned on and the electrodes are gradually separated, thus melting the slag-forming material until a slag bath is formed. This slag bath is preferably of a depth of three feet or more, the upper electrode at this time dipping into the upper part of the bath while the lower part of the bath contacts with the lower electrode, the current passing vertically through the bath. In the majority of cases, I prefer to use an alternating current, and as above stated, a current of high voltage—over two hundred volts. The ore to be reduced is then fed gradually into the top of the furnace around the upper electrode, and this ore rests on the top of the molten slag bath, because the ore is of less specific gravity than that of the bath. As the ore thus lies on the top of the bath, it becomes heated to a temperature where its volatilizable compounds pass off as fumes. Thus, deleterious elements and compounds, such as arsenic and possibly zinc, are driven off by volatilization before the ore enters the slag bath. As more ore is supplied, the ore column gradually sinks into the slag bath and its lower portion becomes melted in the bath and descends through it, forming a pool of reduced or partially reduced material lying in the bottom of the furnace. This lower molten bath may be either a matte, a metal or other element or compound reduced from the ore. The operation then goes on continuously, the metal being tapped off from time to time, as desired, preferably every few hours through the metal tap hole, and the slag being tapped off at the upper tap hole to maintain the slag bath at about the desired depth. This depth of slag bath preferably remains approximately constant throughout the entire smelting operation, since thereby I am enabled to keep the temperature of the bath as well as its density approximately at the desired point. This point will, of course, vary somewhat with the special kind of ore being treated, but when once ascertained and fixed for such special ore, is maintained at the desired point. The tap holes are, of course, opened and closed by the usual plugs which are inserted and removed by hand.

By using a relatively deep slag bath and a higher voltage of electric current, I am enabled to keep the slag bath of substantially the same temperature throughout its different parts, thus making the process uniform in the different parts of the bath.

By the term "deep," as used herein and in the claims with reference to a slag bath, I refer to a bath whose depth is a matter of feet rather than inches. While the exact depth will, of course, depend upon the size and particular character of the furnace this depth should in all cases be in excess of the diameter of the in-feeding ore charge and preferably in no case less than one and one-half feet. This not only enables the use of much higher voltages and the maintenance of a more uniform temperature; but its depth causes it to more effectively hold up the ore above the bath for the desired period, and effects a much more complete separation of the metals from the slag.

It will be understood that the charges added to the furnace during its operation should contain slag-forming compounds. If the ore itself does not contain sufficient of these compounds, as is generally the case, I add these slag-forming compounds or elements to the ore, the mixture being fed in as above stated.

The advantages of my invention will be obvious to those skilled in the art, since a rapid and effective reduction of ores is obtained by electric heat. The process is especially advantageous in districts where proper fuels are difficult to get, and furthermore, a great advantage of my process lies in the volatilizing of deleterious elements and compounds during the preliminary heating of the ore before it enters a slag bath. Instead of the single electrode system shown, a plurality of electrodes may be used for both upper and lower electrode systems, as shown in my Patent, No. 1,070,568, dated August 19, 1913, particularly for larger sized furnaces. The shape and character of the furnace may be varied, different kinds of ores may be treated, and other variations may be made without departing from my invention.

I claim:

1. The method of reducing ores, which consists in continuously maintaining a deep slag bath by passing an electric current vertically through the central portion of the bath, feeding ore into the upper portion of the bath, and maintaining said bath at an approximately constant depth and of a relatively high density whereby the ore is held above the bath for a sufficient period to volatilize to a maximum extent the volatilizable materials, if any, in the ore; substantially as described.

2. The method of reducing ores, which consists in forming a deep slag bath, feeding ore into the upper portion of the bath, and passing an electric current through the central portion of the bath, maintaining the bath at a substantially constant depth and of a relatively high density whereby the ore is held above the bath for a sufficient period to volatilize to a maximum extent the volatilizable materials, if any, in the ore, and affording a free escape for the volatilized materials through the in-feeding ore and at the top of the furnace; substantially as described.

In testimony whereof, I have hereunto set my hand.

RAYMOND S. WILE.

Witnesses:
HARRY A. NEEB, Jr.
JAMES B. DONNELLY.